United States Patent [19]

Nagasu et al.

[11] Patent Number: 5,531,120
[45] Date of Patent: Jul. 2, 1996

[54] COMPACT DIFFERENTIAL PRESSURE TRANSMITTER HAVING FIRST AND SECOND DAMPER CHAMBERS

[75] Inventors: Akira Nagasu; Yoshimi Yamamoto, both of Ibaraki-ken; Tomoyuki Tobita; Toshihiro Onose, both of Katsuta, all of Japan

[73] Assignee: Hitachi, Ltd., Tokyo, Japan

[21] Appl. No.: 49,218

[22] Filed: Apr. 19, 1993

[30] Foreign Application Priority Data

Apr. 23, 1992 [JP] Japan .................................. 4-104262

[51] Int. Cl.⁶ ........................................... G01L 7/08
[52] U.S. Cl. .................. 73/706; 73/716; 73/720; 73/721
[58] Field of Search ............................. 73/706, 721, 756, 73/720, DIG. 4, 726, 727, 716

[56] References Cited

U.S. PATENT DOCUMENTS

| | | | |
|---|---|---|---|
| 4,135,408 | 1/1979 | Di Giovanni | 73/721 |
| 4,364,276 | 12/1982 | Shimazoe et al. | 73/721 |
| 4,466,290 | 8/1984 | Frick | 73/756 |
| 5,036,884 | 8/1991 | Miller et al. | 73/756 |
| 5,094,109 | 3/1992 | Dean et al. | 73/706 X |

FOREIGN PATENT DOCUMENTS

60-185130  9/1985  Japan .

*Primary Examiner*—Richard Chilcot
*Assistant Examiner*—Joseph L. Felber
*Attorney, Agent, or Firm*—Kenyon & Kenyon

[57] ABSTRACT

A differential pressure transmitter detects a differential pressure condition of a fluid by means of a semiconductor sensor. First and second seal diaphragms are provided in a member which constitutes the differential pressure transmitter, to form first and second pressure receiving chambers. An overload protection diaphragm and first and second damper chambers are provided at positions close to the first and second pressure receiving chambers. Also, there are provided a passage for connecting the first pressure receiving chamber and the first damper chamber, a passage for connecting the second pressure receiving chamber and the second damper chamber, and passages for connecting the first and second damper chambers respectively with the semiconductor sensor. Even when a change is caused in the temperature of a processed fluid to be detected, the differential pressure transmitter quickly detects the temperature change, so that a differential pressure of the processed fluid can be measured with high accuracy.

18 Claims, 7 Drawing Sheets

COMPACT DIFFERENTIAL PRESSURE TRANSMITTER HAVING FIRST AND SECOND DAMPER CHAMBERS

BACKGROUND OF THE INVENTION

The present invention relates to a differential pressure transmitter and, more particularly, to a differential pressure transmitter which is excellent in detecting a temperature change of a processed fluid.

Figure 2:
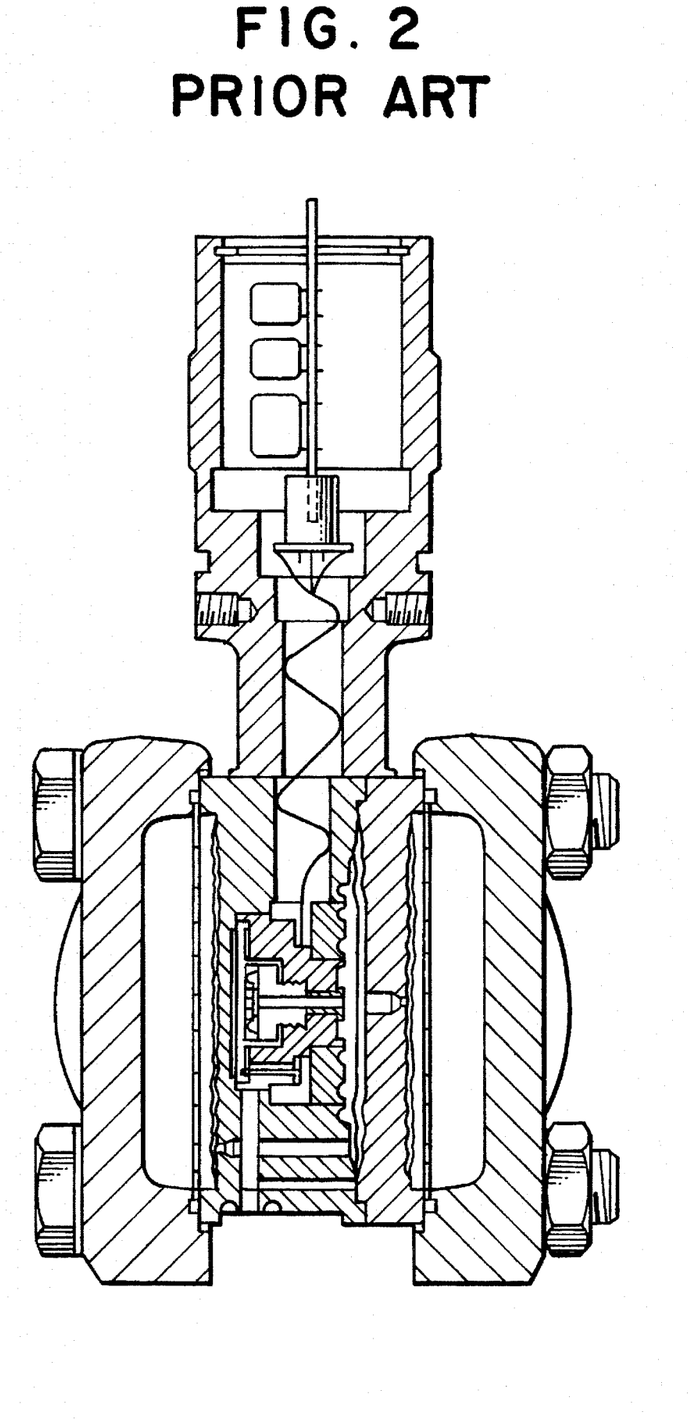
FIG. 2 is a vertical cross-sectional view of a conventional differential pressure transmitter.

In a pressure receiving structure of a conventional differential pressure transmitter, as disclosed in Japanese Patent Unexamined Publication No. 60-185130 (see FIG. 2), seal diaphragms for receiving pressures of first and second fluids are connected on opposite sides of a pressure receiving member so as to form first and second pressure receiving chambers, respectively. A center diaphragm for defining first and second damper chambers, a semiconductor sensor and its support member are provided inside of the pressure receiving member. Further, a pressure passage for connecting the first pressure receiving chamber and the first damper chamber, another pressure passage for connecting the first damper chamber and the semiconductor differential-pressure sensor, still another pressure passage for connecting the second pressure receiving chamber and the second damper chamber, and a pressure passage for connecting the second damper chamber and the semiconductor differential-pressure sensor are formed to apply pressures from the first and second pressure receiving chambers to the semiconductor sensor through the first and second damper chambers, respectively. With this structure, even if an excessive pressure is applied, breakage of the semiconductor sensor for detecting the differential pressure is prevented.

Also, in the conventional differential pressure transmitter, a thermistor is provided on the semiconductor sensor so as to prevent an error in differential pressure detection due to a temperature change of a processed fluid. On the basis of a signal output from the thermistor, a differential pressure of the processed fluid produced from the differential pressure sensor is corrected, to thereby produce an accurate differential-pressure signal.

Moreover, in relation to the maintenance of the differential pressure transmitter, in order to inspect the first and second seal diaphragms connected on the opposite sides of the pressure receiving member, bolts which fasten the pressure receiving member and flanges are loosened, and the pressure receiving member is detached from the main body before inspecting the seal diaphragms.

Furthermore, when a differential pressure transmitter is used, it is necessary to perform inspections regularly as to whether the zero point (the condition where the output of the transmitter is 0% when the differential pressure is 0 mmH$_2$O) varies or not. In the conventional differential pressure transmitter, a special three-way valve is required to be provided between the differential pressure transmitter and the piping so that the higher-side pressure and the lower-side pressure will be equal, i.e., the differential pressure is 0 mmH$_2$O, while the transmitter is kept connected to the piping.

SUMMARY OF THE INVENTION

In the pressure receiving structure of the conventional differential pressure transmitter, the semiconductor sensor is in contact with a sealed liquid which responds to a pressure of the processed fluid, and consequently, the temperature of the processed fluid is transmitted to the thermistor which detects the temperature in the following manner. First, a temperature change of the processed fluid is transmitted to the sealed liquid in the pressure receiving chamber, and the temperature of the sealed liquid is further transmitted to the thermistor of the semiconductor sensor via the sealed liquid in the damper chamber. However, the temperature of the sealed liquid in the pressure receiving chamber is transmitted to the sealed liquid in the damper chamber through the sealed liquid in the passage which is formed to extend over the semiconductor sensor and its support member which are provided inside of the pressure receiving member, so that a time lag is caused in temperature transmission owing to this passage. Therefore, it is difficult to detect an accurate differential pressure condition.

Also, in relation to the maintenance of the differential pressure transmitter, the pressure receiving member and the flanges are separated from each other, and then, the pressure receiving member is detached from the main body before inspecting the seal diaphragms. Thus, the operation is troublesome.

Further, a special three-way valve must be provided between the differential pressure transmitter and the piping in order to perform the zero-point adjustment in a regular inspection, thereby increasing the number of operational steps for installing the differential pressure transmitter.

In order to solve the above-described problems, a differential pressure transmitter according to the present invention has a structure in which seal diaphragms for receiving first and second pressures are formed on one end surface of a pressure receiving member so as to define pressure receiving chambers, and also, an overload protection diaphragm is formed between that end surface of the pressure receiving member where the seal diaphragms are formed and a semiconductor sensor, thereby defining first and second damper chambers.

An inspection port is provided in a member which cooperates with the seal diaphragm in defining a portion for introducing a processed fluid. The inspection port is located opposite to the seal diaphragm, and is designed to be detachable.

Also, a first opening is formed in a member which cooperates with the first seal diaphragm in defining a portion for introducing a first processed fluid, and a second opening is formed member which cooperates with the second seal diaphragm in defining a portion for introducing a second processed fluid. Means for communication between these openings are provided to equalize pressures of the first and second processed fluids.

According to the differential pressure transmitter of the invention, the first and second damper chambers can be provided at positions close to the first and second pressure receiving chambers, so that the pressure passages for connecting the pressure chambers can be shortened.

Moreover, since the inspection port is provided on the portion for introducing the processed fluid, the seal diaphragm can be inspected by opening the inspection port. Thus, the inspection can be performed without detaching the pressure receiving member from the differential pressure transmitter.

Furthermore, the openings are formed on the portions for introducing the first and second processed fluids, and the means for communication between these openings are provided to equalize the pressures of the first and second processed fluids, so that the zero-point adjustment can be effected without installing a three-way valve between the piping and the differential pressure transmitter.

DETAILED DESCRIPTION OF THE PREFERRED EMBODIMENTS

A differential pressure transmitter according to the present invention will be hereinafter described with reference to the attached drawings.

Figure 1:
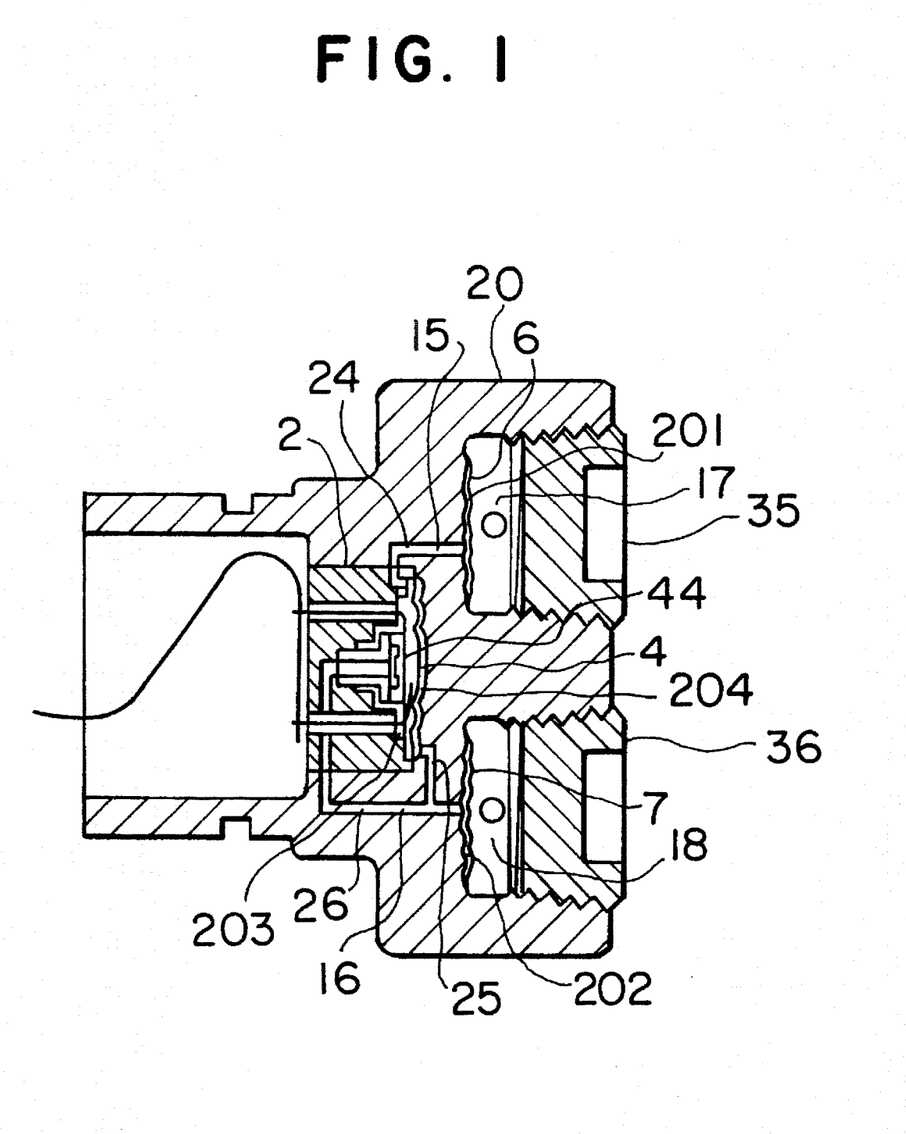
FIG. 1 is a vertical cross-sectional view showing a differential pressure transmitter according to an embodiment of the present invention.

FIG. 1 shows a differential pressure transmitter according to an embodiment of the invention. This differential pressure transmitter mainly comprises a pressure receiving member 20, a sensor sub-assembly 2, seal diaphragms 6 and 7, an overload protection diaphragm 4, first and second pressure receiving chambers 201 and 202, and first and second damper chambers 203 and 204.

Figure 3:
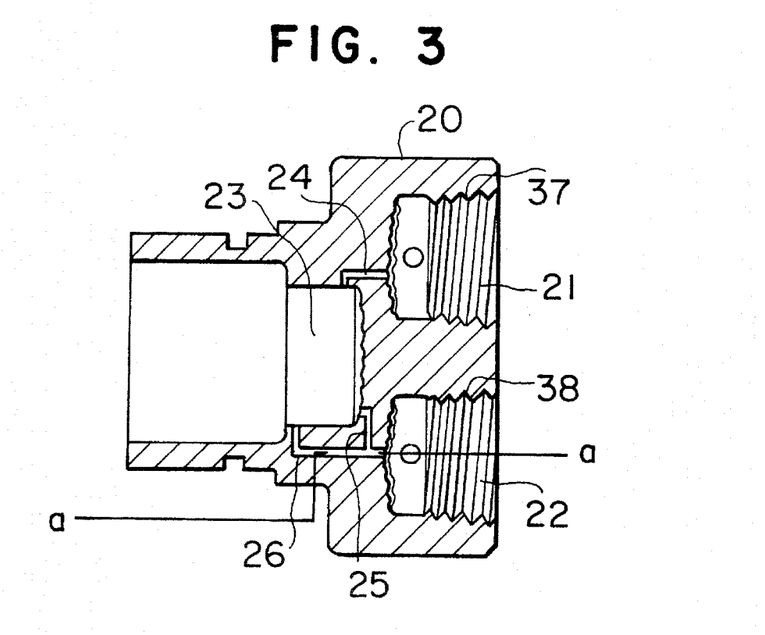
FIG. 3 is a vertical cross-sectional view showing a pressure receiving member of the differential pressure transmitter shown in FIG. 1.

FIG. 3 shows the pressure receiving member 20 in FIG. 1 in detail. The pressure receiving member 20 is a single member in which cylindrical portions 21 and 22 are formed in axially symmetric relation with each other for installation of the seal diaphragms 6 and 7. Bottom surfaces of the cylindrical portions 21 and 22 are machined to have substantially the same configurations as the seal diaphragms 6 and 7. Inlets of the cylindrical portions 21 and 22 are machined into taper screw-threaded portions 37 and 38 having larger diameters than the seal diaphragms 6 and 7 so that pressure pipes are directly connected to these screw-threaded portions. A bore portion 23, in which the overload protection diaphragm 4 and the sensor sub-assembly 2 are to be accommodated, is formed in the pressure receiving member 20 along its axis. A bottom surface of the bore portion 23 is machined to have substantially the same configuration as the overload protection diaphragm 4. Then, the cylindrical portions 21 and 22 for attaching the seal diaphragms 6 and 7 and the bore portion 23 for attaching the overload protection diaphragm 4 and the sensor sub-assembly 2 are connected to one another by passages 24, 25 and 26, respectively.

Figure 4:
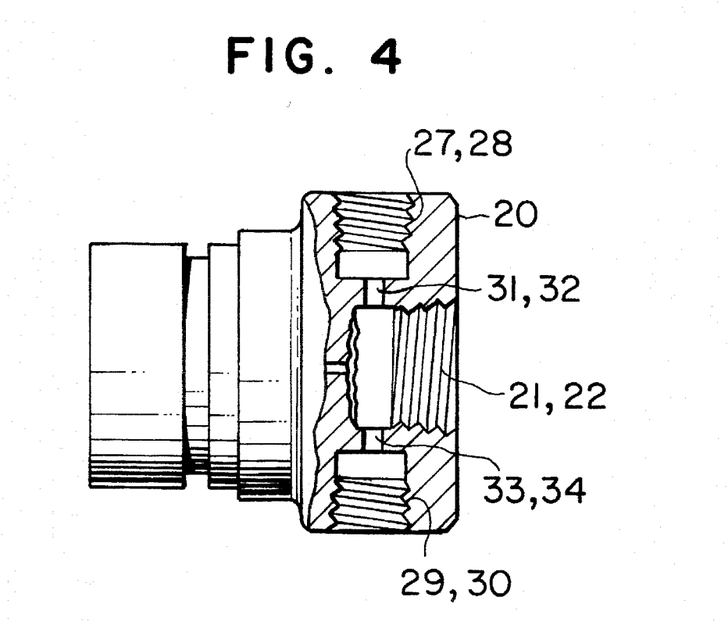
FIG. 4 is a cross-sectional view taken along the line a—a of FIG. 3.

FIG. 4 is a cross-sectional view taken along the line a—a of FIG. 3.

A portion of the pressure receiving member 20 above the cylindrical portion 22 for attaching the seal diaphragm 7 is machined to have a bore with a taper screw thread 28, and a portion of the member 20 below the cylindrical portion 22 is machined to have a bore with a taper screw thread 30. These bores are connected to the cylindrical portion 22 by passages 32 and 34. Similarly, portions of the member 20 above and below the cylindrical portion 21 are machined to have bores with taper screw threads 27 and 29, and connected by passages 31 and 33.

The structures of the first and second pressure receiving chambers 201 and 202, and those of the first and second damper chambers 203 and 204 in the differential pressure transmitter according to the embodiment of the invention will now be described with reference to FIG. 1.

In the differential pressure transmitter of this embodiment, the seal diaphragms 6 and 7 are installed in the pressure receiving member 20 through the cylindrical portions 21 and 22, and welded therein in, respectively, such a manner that surfaces of the seal diaphragms 6 and 7 face the same side, thus forming the first and second pressure receiving chambers 201 and 202.

Then, the overload protection diaphragm 4 is installed in the bore portion 23 of the pressure receiving member 20, and welded therein so as to face the same side as the seal diaphragms 6 and 7, thereby forming the second damper chamber 204. A semiconductor sensor 44 is joined onto a surface of the sensor subassembly 2 in such a manner that the semiconductor sensor 44 will be located on the surfaces constituting the first damper chamber 203 when the sensor sub-assembly 2 is assembled into the pressure receiving member 20. This sensor sub-assembly 2 is installed in and joined to the pressure receiving member 20 from the side remote from the seal diaphragms 6 and 7, thus forming the second damper chamber 204.

A sealed liquid 15 is filled in a space including the first pressure receiving chamber 201 and the first damper chamber 203 which are surrounded by the seal diaphragm 6, the passage 24, the overload protection diaphragm 4 and the sensor sub-assembly 2. Likewise, a sealed liquid 16 is filled in a space including the second pressure receiving chamber 202 and the second damper chamber 204 which are surrounded by the seal diaphragm 7, the passages 25 and 26, the overload protection diaphragm 4 and the sensor sub-assembly 2. In consequence, the first and second pressure receiving chambers 201 and 202 and the first and second damper chambers 203 and 204 can be constituted by joining the seal diaphragms 6 and 7, the overload protection diaphragm 4, the single pressure receiving member 20 and the sensor sub-assembly 2.

The overload protection diaphragm 4 is a diaphragm for protecting the semiconductor sensor 44 when an excessively large pressure is applied to the seal diaphragm 6 or 7. When an excessively large pressure is applied, the seal diaphragm 6 seats on the portion of the pressure receiving member 20 which is machined in substantially the same corrugated form as the seal diaphragm 6, to thereby prevent the inner pressure of the sealed liquid 15 from increasing. The overload protection diaphragm 4 functions in such a manner that an amount of the liquid moving until the seal diaphragm 6 is seated is absorbed by the first and second damper chamber 203 and 204, thus suppressing an increase in the inner pressure of the liquid to a proof pressure of the semiconductor sensor 44 or less. As a result, the semiconductor sensor 44 is protected.

An embodiment in which the differential pressure transmitter according to the invention is connected to pressure piping will be described with reference to FIG. 5. The pressure receiving member 20 has the taper screw threads 27 and 28 respectively formed on the upper side of the cylindrical portions 21 and 22 for attaching the seal diaphragms 6 and 7, as shown in FIG. 4. Connecting portions of pressure pipes 45 and 46 for introducing a processed fluid are provided with taper screw threads to be connected to the pressure receiving member 20, and these threads are wound with seal tapes.

Therefore, in order to connect the pressure receiving member 20 to the pressure pipes 45 and 46, the taper screw-threaded portions of the pressure pipes 45 and 46 are inserted into the taper screw-threaded portions of the pressure receiving member 20 and tightened thereto. Thus, connections can be easily effected.

The differential pressure detecting operation of the differential pressure transmitter constructed as above will be explained with reference to FIG. 1.

When a first pressure from the processed fluid is applied to the seal diaphragm 6, the first pressure of the processed fluid is transmitted, through the seal diaphragm 6, to the sealed liquid 15 in the first pressure receiving chamber 201 on the rear side of the seal diaphragm 6. Further, the first pressure is transmitted, via the passage 24, to the first damper chamber 203 which is defined between the overload protection diaphragm 4 and the semiconductor sensor 44. Also, when a second pressure from the processed fluid is applied to the seal diaphragm 7, the second pressure of the processed fluid is likewise transmitted, through the seal diaphragm 7, to the sealed liquid 16 in the second pressure receiving chamber 202. Then, the second pressure is transmitted, via the passage 25, to the second damper chamber 204 which is defined between the overload protection diaphragm 4 and the pressure receiving member 20. The second pressure is transmitted also to the rear surface of the sensor via the passage 26. In this manner, the semiconductor sensor 44 detects a difference between the first and second pressures of the processed fluid which have been transmitted to the front and rear sides of the sensor diaphragm, respectively.

In order to obtain high accuracy in determination of a differential pressure of the processed fluid, it is necessary to detect temperatures of the processed fluid. Temperature changes of the processed fluid are transmitted to the first and second damper chambers 203 and 204 through the sealed liquids 15 and 16 filled in the first and second pressure receiving chambers 201 and 202, so that a thermistor mounted on the semiconductor sensor 44 can detect temperature changes of the processed fluid. Thus, the transmitter can correct the differential pressure condition detected by the semiconductor sensor 44 by use of a temperature detection signal from the thermistor to know an accurate differential pressure condition and give an output.

In the differential pressure transmitter according to the invention, as described above, the first and second damper chambers 203 and 204, which are formed in the pressure receiving member 20 and defined by the overload protection diaphragm 4, can be located close to the first and second pressure receiving chambers 201 and 202, so that the passage 24 for connecting the first damper chamber 203 with the first pressure receiving chamber 201 and the passage 25 for connecting the second damper chamber 204 with the second pressure receiving chamber 202 can be made shorter. Accordingly, the passages for transmitting the condition of the processed fluid from pressure reception chambers 17 and 18 to the semiconductor sensor 44 can be shortened as a whole. Consequently, temperature changes of the processed fluid detected by the pressure reception chambers 17 and 18 are quickly transmitted to the semiconductor sensor 44. As a result, even when a processed fluid having drastic temperature changes is measured, its differential pressure condition can be detected with high accuracy.

Moreover, the semiconductor sensor 44 with the thermistor is provided on the surface which constitutes the first damper chamber 203, and the semiconductor sensor 44 is installed to face the pressure receiving chambers 201 and 202. Therefore, temperature changes generated in the pressure receiving chambers 201 and 202 can be measured more quickly and more accurately.

Furthermore, a member for forming the first pressure receiving chamber, a member for forming the second pressure receiving chamber and a member for forming one of the damper chambers can be made of a single member. Thus, the number of component parts is reduced, so that temperature changes of the processed fluid can be quickly transmitted to the semiconductor sensor 44 through the single member.

Besides, the pressure pipes can be supported directly by the member for forming the pressure receiving chambers, and consequently, flanges, bolts, nuts and so forth which have been used for the conventional differential pressure transmitter are no longer necessary, thereby decreasing the number of component parts remarkably.

A mechanism for facilitating an inspection of the seal diaphragms will now be described with reference to FIG. 5.

The pressure pipes 45 and 46 are fixed to the taper screw-threaded portions 27 and 28, respectively, and drain valves 39 and 40 are fixed in the taper screw-threaded portions 29 and 30, while plugs 35 and 36 are fitted in the taper screw-threaded portions 37 and 38. With such a structure, when the seal diaphragms 6 and 7 are to be inspected, an inspection can be carried out merely by removing the plugs 35 and 36. In other words, while keeping the differential pressure transmitter connected to the pressure pipes 45 and 46, the plugs 35 and 36 are removed, and then, the seal diaphragms 6 and 7 appear. An operator in charge of the maintenance can inspect them by visual observation. After inspecting them, the operation can be completed merely by winding seal tapes about taper screw-threaded portions of the plugs 35 and 36 anew and by tightening the plugs in position. Since the inspecting operation can be facilitated in this manner, the invention has great effects in respect of the maintenance.

Also, in this embodiment, the taper screw-threaded portions are provided at the portions of the pressure receiving member 20, where the fluid to be measured is introduced, to extend in opposite directions to each other. Consequently, even if the fluid flowing in the pressure pipes 45 and 46 contains sludge or other impurities, the drain valves 39 and 40 are detached, and then, sludge or other impurities collecting in the vicinity of the seal diaphragms 6 and 7 can be removed, while the pressure receiving member 20 is kept connected to the pressure pipes 45 and 46.

Further, although it is difficult when the differential pressure transmitter is connected to the pressure pipes 45 and 46 in the direction described in this embodiment, in case that the fluid to be measured contains gas bubbles, the drain valves 39 and 40 may be provided in such a direction that the gas will move upwardly and be released. Thus, gas bubbles collecting in the vicinity of the seal diaphragms 6 and 7 can be removed by opening the drain valves 39 and 40.

In this embodiment, the drain valves 39 and 40 are provided in the opposite direction to the pressure pipes 45 and 46. However, they may be provided in a desired direction, for example, at an angle of 90° with respect to the pressure pipes 45 and 46.

Generally, a differential pressure transmitter is designed to produce a signal of DC 4 mA when the detected differential pressure of the processed fluid is 0% and to produce a signal of DC 20 mA when the differential pressure is 100%. Therefore, when the differential pressure transmitter is attached to the pressure piping, a three-way valve has to be provided between the transmitter and the pressure piping and used to produce a condition where the differential pressure applied to the transmitter is 0%, regularly during the operation time after the attachment, and an adjustment (zero-point adjustment) must be carried out so that the transmitter outputs a signal of DC 4 mA when the detected differential pressure is 0%.

Figure 6:
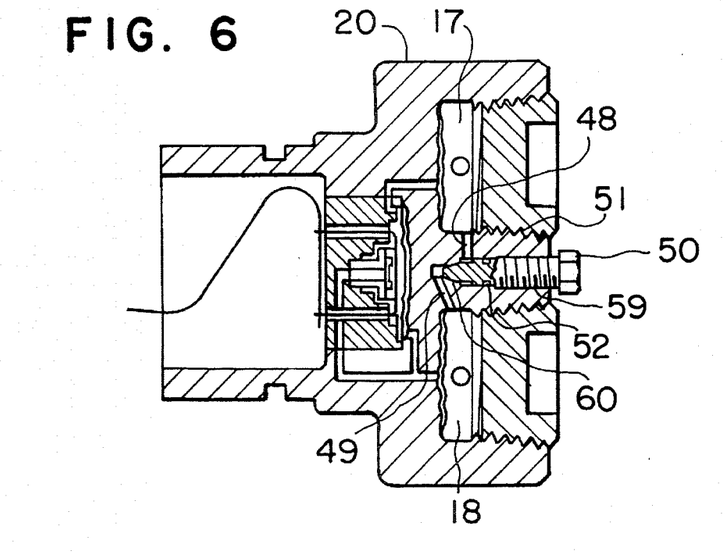
FIG. 6 is a cross-sectional view showing a differential pressure transmitter according to another embodiment of the invention, in which pressure passages are formed in a pressure receiving member.

A differential pressure transmitter according to another embodiment of the invention, which includes a mechanism for performing this zero-point adjustment easily, will now be described with reference to FIG. 6.

Figure 9:
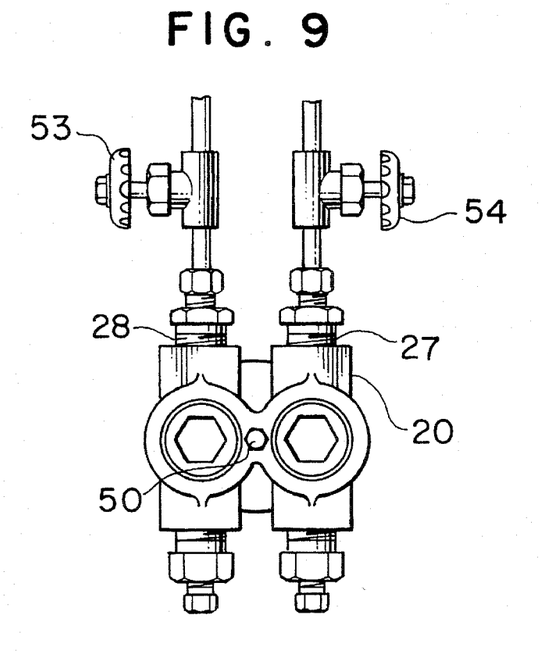
FIG. 9 is a view showing an example of connection between the differential pressure transmitter of the invention and stop valves.
Figure 10:
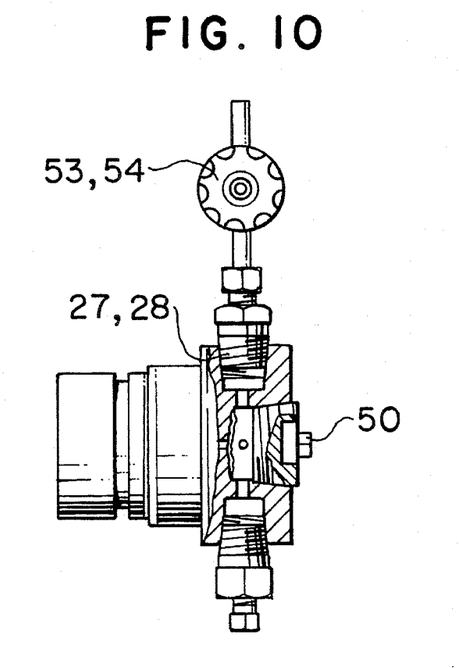
FIG. 10 is a side view of the example shown in FIG. 9.

Communication holes 48 and 49 for connecting a processed fluid pressure chamber 17 and a processed fluid pressure chamber 18 are formed in a pressure receiving member 20, and a plug 50 for intercepting this communication is provided between the communication holes 48 and 49. The plug 50 comprises a taper portion 60 for interception, an O-ring 52 for pressure seal and a screw-fastener 59 for tightening. Also, as shown in FIGS. 9 and 10, the differential pressure transmitter of this embodiment is connected to processed fluid piping through stop valves 53, 54 which are attached to taper screw threads 27 and 28 of the pressure receiving member 20.

When the zero-point adjustment is performed with the differential pressure transmitter of this embodiment, the stop valves 53 and 54 are closed, and the plug 50 is opened, to thereby make the differential pressure 0%. More specifically, pressure changes of the processed fluid are interrupted by closing the stop valves 53 and 54, and subsequently, the processed fluid pressure chambers 17 and 18 are connected through the communication holes 48 and 49 by rotating the plug 50, so as to equalize the pressures in the processed fluid pressure chambers 17 and 18. Then, the differential pressure transmitter is adjusted in such a manner that the output of the transmitter is 0% when the differential pressure is 0%.

Figure 7:
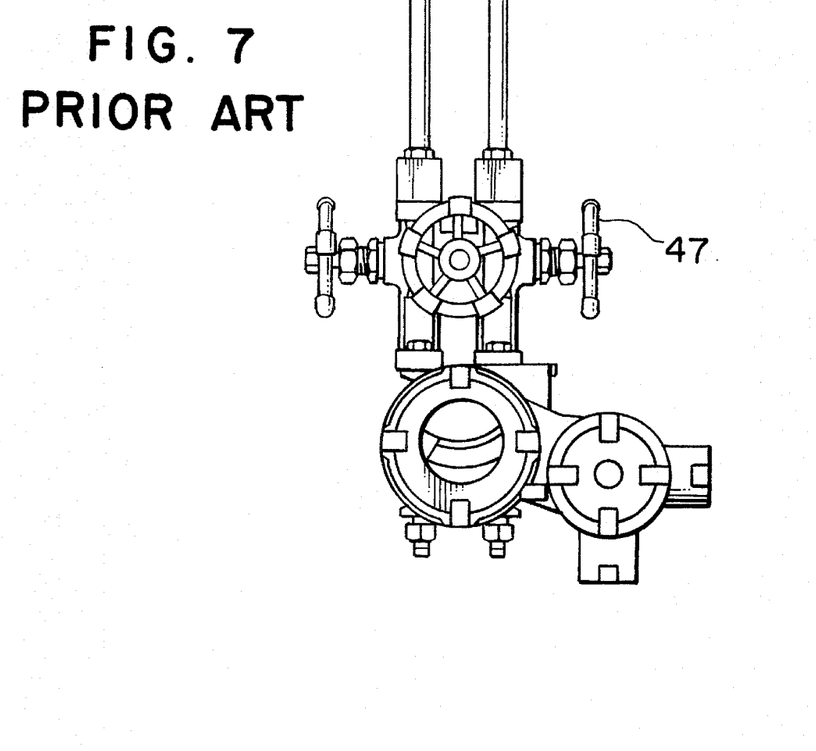
FIG. 7 is a view showing an example of connection between the conventional differential pressure transmitter and a three-way valve.
Figure 8:
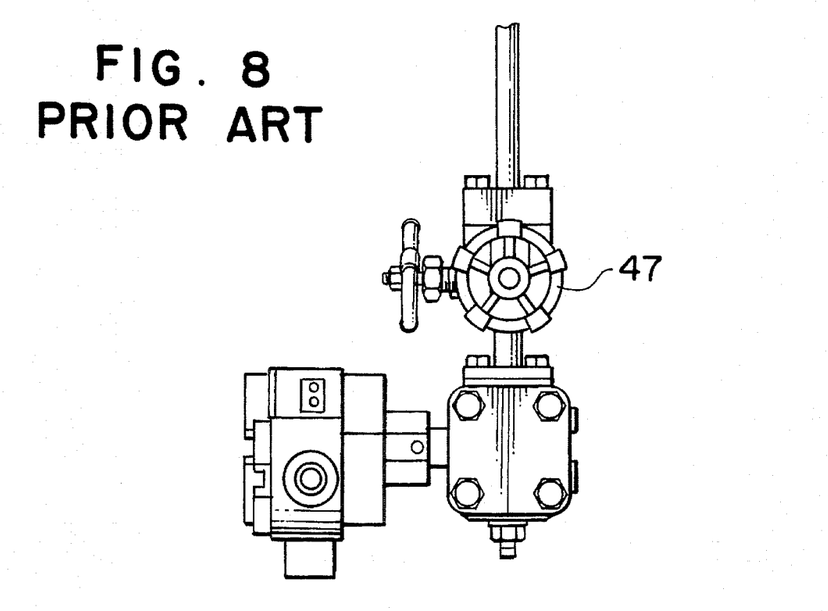
FIG. 8 is a side view of the example shown in FIG. 7.

With the differential pressure transmitter of this embodiment, as described above, it is not necessary to use any special means such as the three-way valve 47 of the conventional example shown in FIGS. 7 and 8 because the plug 50 is provided in the transmitter, and it is possible to perform the zero-point adjustment by means of the stop valves generally used.

In the conventional zero-point adjustment method with the three-way valve, since the three-way valve is formed in one body, when one of the three valves malfunctions, the whole three-way valve has to be replaced even if the other two valves function normally. According to the differential pressure transmitter of the invention, however, if one of the stop valves malfunctions, the adjustment can be effected by replacing this stop valve alone.

Moreover, in the embodiment shown in FIGS. 9 and 10, the structure in which the pressures in the processed fluid pressure chambers 17 and 18 are equalized through the communication holes 48 and 49 formed in the pressure receiving member 20 has been described to perform the zero-point adjustment. Another zero-point adjustment method will be shown in FIGS. 11 and 12.

Figure 5:
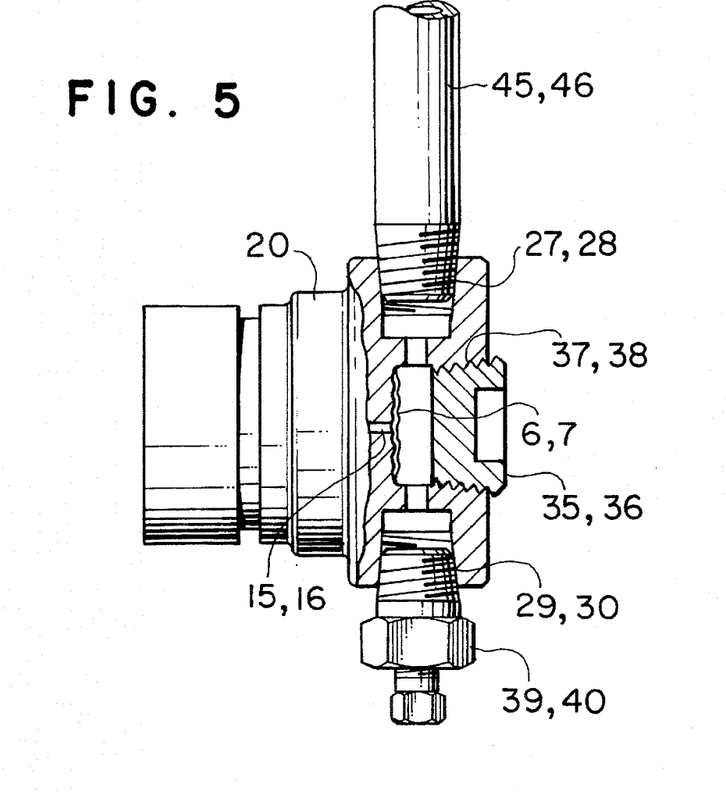
FIG. 5 is a partially cross-sectional view showing an example of connection between the differential pressure transmitter of the invention and pressure piping.
Figure 11:
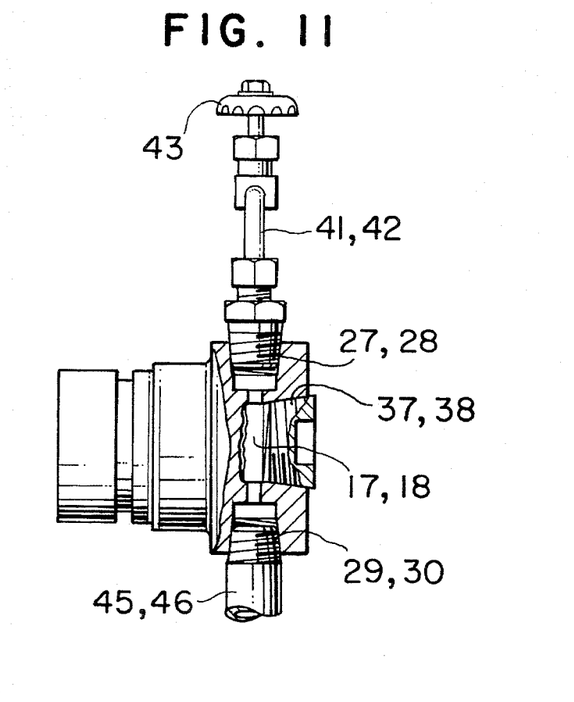
FIG. 11 is a partially cross-sectional view showing the differential pressure transmitter according to the embodiment of the invention, to which pressure piping and a stop valve are connected.
Figure 12:
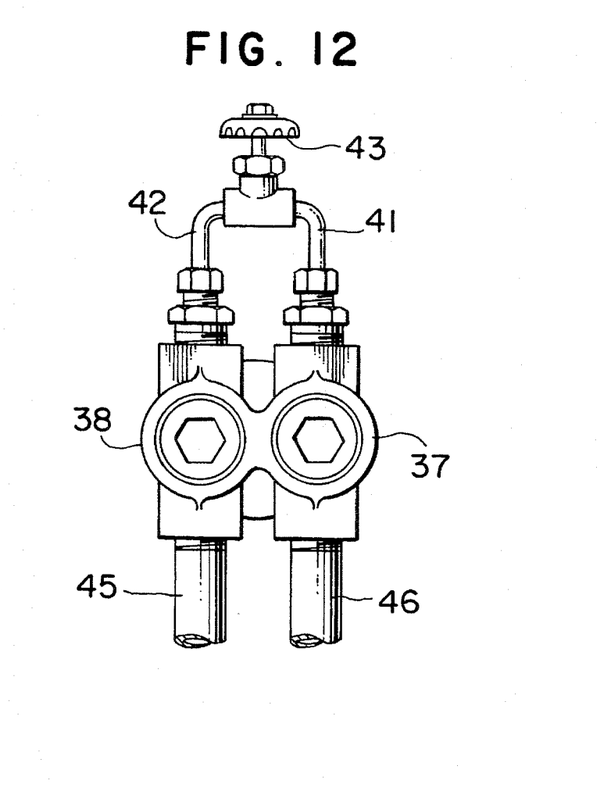
FIG. 12 is a side view showing the differential pressure transmitter shown in FIG. 11.

In this embodiment, while the pressure pipes 45 and 46 are kept attached to the differential pressure transmitter shown in FIG. 5, the drain valves 39 and 40 are removed and, instead, pipes 41 and 42 having a stop valve 43 provided therebetween are connected to the opening portions of the transmitter. With such a structure, when performing the zero-point adjustment, the pressures in the processed fluid pressure chambers 17 and 18 can be equalized simply by opening the stop valve 43. Consequently, it is not necessary to install a special three-way valve.

Although the differential pressure transmitter of the invention has been described on the basis of the above embodiments, it is not limited to these structures. For example, in the embodiments of the differential pressure transmitter, members for forming the first pressure receiving chamber, the second pressure receiving chamber and one of the damper chambers are constituted of a single member. However, an equivalent member can be manufactured by joining a plurality of members.

Also, the first and second seal diaphragms and the overload protection diaphragm are provided to face the same side. However, they can be provided to face different directions so far as pressure detecting functions of these diaphragms are maintained.

According to the differential pressure transmitter of the invention, even if the processed fluid to be detected has a change in the temperature, the temperature change can be detected quickly to detect the differential pressure of the processed fluid accurately.

Moreover, when inspecting the seal diaphragms, the inspection can be carried out while Keeping the differential pressure transmitter attached to the pressure pipes, so that the number of inspecting steps can be lessened.

Furthermore, the zero-point adjustment can be performed not with the three-way valve conventionally required but with the stop valves, so that the number of required component parts can be lessened.

What is claimed is:

1. A differential pressure transmitter comprising:

a first pressure receiving chamber transmitting a pressure of a first measurement fluid to a first detection fluid contained in a member through a first diaphragm connected to said member;

a second pressure receiving chamber transmitting a pressure of a second measurement fluid to a second detection fluid contained in said member through a second diaphragm connected to said member;

said first and second diaphragms are substantially coplanar:

a semiconductor sensor detecting a difference between a pressure of said first detection fluid and a pressure of said second detection fluid; and a third diaphragm connected to said member to form a first damper chamber and a second damper chamber;

wherein the pressure of said first detection fluid and the pressure of said second detection fluid are applied to said semiconductor sensor via said first damper chamber and said second damper chamber, respectively, said first diaphragm and said second diaphragm are formed on one end surface of said member, said third diaphragm is provided between said one end surface of said member and said semiconductor sensor and substantially parallel to said first and second diaphragms, and a member for forming said first damper chamber or said second damper chamber and a member for forming said first pressure receiving chamber and a member for forming said second pressure receiving chamber are constituted by a single member.

2. A differential pressure transmitter according to claim 1, wherein a surface of said first diaphragm and a surface of said second diaphragm are oriented in the same direction.

3. A differential pressure transmitter according to claim 2, wherein a surface of said third diaphragm is oriented the same direction as said surface of said first diaphragm and said surface of said second diaphragm.

4. A differential pressure transmitter according to claim 1, wherein said semiconductor sensor has a support member which defines another end surface of said member opposite said one end surface thereof.

5. A differential pressure transmitter according to claim 1, wherein said single member and a member for supporting said semiconductor sensor are joined to hermetically seal said first detection fluid and said second detection fluid therein.

6. The differential pressure transmitter of claim 1 wherein at least one of said first and second pressure receiving chambers has an opening for connection of a pressure piping for one of the pressures of the first and second measurement fluids, said opening being so located that the one of the pressures of the first and second measurement fluids is introduced substantially perpendicularly to a direction in which the one of the pressures of the first and second measurement fluids acts on an associated one of said first and second diaphragms.

7. A differential pressure transmitter according to claim 6, wherein at least one additional opening other than said opening for connection of the pressure piping is formed in at least one of said first and second pressure receiving chambers, and said at least one additional opening is closed by a plug element.

8. A differential pressure transmitter according to claim 7, wherein said at least one additional opening is located at a position opposite to the associated one of said first and second diaphragms.

9. A differential pressure transmitter according to claim 8, wherein said opening for connection of the pressure piping and said at least one additional opening are located at positions opposite to each other.

10. A differential pressure transmitter according to claim 6, wherein said opening for connection of the pressure piping is formed as openings in each of said first and second pressure receiving chambers, and said openings in said first and second pressure receiving chambers are connected to each other by pressure pipes which are provided with a stop valve.

11. The differential pressure transmitter of claim 1 wherein said member has a first opening provided for transmitting said first measurement fluid to said first diaphragm and a second opening provided for transmitting said second measurement fluid to said second diaphragm, wherein at least one additional opening other than said first and second openings is formed in at least one portion of said member where said first and second detection fluids are transmitted.

12. A differential pressure transmitter according to claim 11, wherein said first and second openings are located at positions opposite to at least one of said first and second diaphragms.

13. A differential pressure transmitter according to claim 11, wherein a plurality of openings are formed in at least one of the portions of said member where said first and second detection fluids are transmitted, said plurality of openings being located at positions opposite to each other.

14. A differential pressure transmitter comprising a first pressure receiving chamber for transmitting a pressure of a first measurement fluid to a first detection fluid contained in a member through a first diaphragm connected to said member, a second pressure receiving chamber for transmitting a pressure of a second measurement fluid to a second detection fluid contained in said member through a second diaphragm connected to said member, said first and second diaphragms being substantially coplanar, a semiconductor sensor for detecting a difference between the pressure of said first measurement fluid and the pressure of said second measurement fluid, and a third diaphragm connected to said member to form a first damper chamber and a second damper chamber, the pressure of said first detection fluid and the pressure of said second detection fluid being applied to said semiconductor sensor via said first damper chamber and said second damper chamber, respectively, said first diaphragm and said second diaphragm being provided in a member on one side of said third diaphragm and said third diaphragm being substantially parallel to said first and second diaphragms and a member for forming said first damper chamber or said second damper chamber and a member for forming said first pressure receiving chamber and a member for forming said second pressure receiving chamber are constituted by a single member.

15. A differential pressure transmitter comprising a member having first and second detection fluids confined therein, a first diaphragm and a second diaphragm attached to said member, said first and second diaphragm being substantially coplanar, a first pressure receiving chamber for transmitting a pressure of a first measurement fluid to said first detection fluid through said first diaphragm, a second pressure receiving chamber for transmitting a pressure of a second measurement fluid to said second detection fluid through said second diaphragm, a third diaphragm connected to said member to form a first damper chamber and a second damper chamber;

wherein the pressure of said first detection fluid and the pressure of said second detection fluid are applied to a semiconductor sensor via said first damper chamber and said second damper chamber, respectively, said first diaphragm and said second diaphragm being formed on one end surface of said member, said third diaphragm being provided between said one end surface of said member and said semiconductor sensor and substantially parallel to said first and second diaphragms, a pressure communication passage formed in said member and providing communication between said first and second measurement fluids, and a stop valve provided in said member to interrupt the communication through said pressure communication passage, and wherein the semiconductor sensor comprises a differential pressure detector detecting a difference between the pressure of said first detection fluid and the pressure of said second detection fluid.

16. A differential pressure transmitter comprising:

a member having first and second detection fluids confined therein, first and second diaphragms attached to said member, said first end second diaphragms being substantially coplanar, first and second pressure receiving chambers for transmitting pressures of first and second measurement fluids to said first and second detection fluids through said first and second diaphragms, respectively, a third diaphragm connected to said member to form a first damper chamber and a second damper chamber;

wherein the pressure of said first detection fluid and the pressure of said second detection fluid are applied to a semiconductor sensor via said first damper chamber and said second damper chamber, respectively, said first diaphragm and said second diaphragm are formed on one end surface of said member, and said third diaphragm is provided between said one end surface of said member and said semiconductor sensor and substantially parallel to said first and second diaphragms and, wherein the semiconductor sensor comprises a differential pressure detector detecting a difference between the pressures of the first and second detection fluids, at least one of said first and second pressure receiving chambers having two openings and a plug element, one of said openings being for connection of a pressure piping for one of the pressures of the first and second measurement fluids and so located that the one of the pressures of the first and second measurement fluids is introduced substantially perpendicularly to a direction in which the one of the pressures of the first and second measurement fluids acts on associated one of said first and second diaphragms, another of said openings being located at a position opposite to the associated one of said first and second diaphragms, said plug element closing the other of said openings and a member for forming said first damper chamber or said second damper chamber and a member for forming said first pressure receiving chamber and a member for forming said second pressure receiving chamber are constituted by a single member.

17. A differential pressure transmitter according to claim 16, wherein said two openings and said plug element are provided in each of said first and second measurement chambers.

18. A differential pressure transmitter according to claim 17, wherein each of said first and second measurement chambers further has still another opening for a drain valve.

\* \* \* \* \*

UNITED STATES PATENT AND TRADEMARK OFFICE
CERTIFICATE OF CORRECTION

PATENT NO.   : 5,531,120
DATED        : Jul. 2, 1996
INVENTOR(S)  : Akira Nagasu et al.

It is certified that error appears in the above-indentified patent and that said Letters Patent is hereby corrected as shown below:

| Column | Line | |
|--------|------|---|
| 2 | 44 | Before "member" insert --in a--. |
| 3 | 37 | Delete "OF THE". |
| 3 | 38 | Delete "PREFERRED EMBODIMENTS". |
| 8 | 39 | Change "Keeping" to --keeping--. |
| 9 | 14 | After "oriented" insert --in--. |

Signed and Sealed this

Third Day of December, 1996

Attest:

BRUCE LEHMAN

Attesting Officer         Commissioner of Patents and Trademarks